(12) United States Patent
Chhabra et al.

(10) Patent No.: US 11,153,739 B1
(45) Date of Patent: Oct. 19, 2021

(54) EMERGENCY MODE FOR MOBILE DEVICES

(71) Applicant: Micron Technology, Inc., Boise, ID (US)

(72) Inventors: Bhumika Chhabra, Boise, ID (US); Claudia A. Delaney, Garden City, ID (US); Madison E. Wale, Boise, ID (US); Elsie de la Garza Villarreal, Nampa, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/891,572

(22) Filed: Jun. 3, 2020

(51) Int. Cl.
  *H04W 4/90* (2018.01)
  *G10L 15/08* (2006.01)
  *H04W 4/029* (2018.01)
  *G10L 17/00* (2013.01)

(52) U.S. Cl.
  CPC ............. *H04W 4/90* (2018.02); *G10L 15/083* (2013.01); *G10L 17/00* (2013.01); *H04W 4/029* (2018.02)

(58) Field of Classification Search
  CPC ...... H04W 4/90; H04W 4/029; G10L 15/083; G10L 17/00
  USPC ...................................................... 455/404.2
  See application file for complete search history.

(56) References Cited

U.S. PATENT DOCUMENTS

| | | | |
|---|---|---|---|
| 2005/0197096 A1* | 9/2005 | Yang | H04L 51/20 455/404.1 |
| 2010/0048159 A1 | 2/2010 | Stenquist | |
| 2012/0016678 A1* | 1/2012 | Gruber | B60K 35/00 704/275 |
| 2013/0252571 A1* | 9/2013 | Lee | H04W 4/90 455/404.1 |
| 2013/0331058 A1 | 12/2013 | Harvey | |
| 2014/0222436 A1* | 8/2014 | Binder | G10L 21/16 704/275 |

(Continued)

FOREIGN PATENT DOCUMENTS

KR 20100085485 A 7/2010

OTHER PUBLICATIONS

International Application No. PCT/US2021/032669—International Search Report and Written Opinion, dated Sep. 2, 2021, 9 pages.

*Primary Examiner* — William Nealon
(74) *Attorney, Agent, or Firm* — Perkins Coie LLP (57) ABSTRACT

Methods and apparatuses for emergency modes for a mobile device (e.g., a mobile phone) are described. The mobile device may receive sonic signals indicative of a voice of a person uttering words and identify the person as an authorized user. The mobile device may determine that the words correlate with an emergency situation from a set of predefined emergency situations. Further, the mobile device may determine that the emergency situation satisfies a threshold. The mobile device may perform one or more tasks (e.g., making a phone call to an emergency service), after determining that the emergency situation has satisfied the threshold. In some cases, the mobile device may monitor physiological signals of the person and/or collect additional data to increase a confidence level associated with making the determination. In some cases, the mobile device may leverage or include an artificial intelligence algorithm/engine to facilitate managing the emergency modes.

17 Claims, 4 Drawing Sheets

(56) References Cited

U.S. PATENT DOCUMENTS

| | | | |
|---|---|---|---|
| 2014/0272821 A1* | 9/2014 | Pitschel | G09B 19/06 |
| | | | 434/157 |
| 2014/0370841 A1* | 12/2014 | Roberts | H04M 1/72536 |
| | | | 455/404.2 |
| 2017/0064529 A1 | 3/2017 | Lee et al. | |
| 2017/0295481 A1* | 10/2017 | Pospiel | H04W 4/90 |
| 2018/0053394 A1 | 2/2018 | Gersten | |
| 2018/0310159 A1* | 10/2018 | Katz | H04W 4/50 |

\* cited by examiner

Figure 4 though voice activation without using their hands. Moreover, the present technology may be useful for individuals having limited access to the mobile devices (e.g., young children, people with disabilities) to make emergency calls.

EMERGENCY MODE FOR MOBILE DEVICES

TECHNICAL FIELD

The present disclosure generally relates to mobile devices, and more particularly relates to managing emergency modes for mobile devices.

BACKGROUND

Mobile devices (e.g., cellular phones) are widely deployed, assisting users in many aspects of their daily lives. For example, the users may store various information about their contacts (e.g., phone numbers of individuals, business entities, and/or public authorities) such that they can conveniently reach out to their contacts using the information stored in the mobile devices. In some instances, the users may face emergency situations that require immediate assistance from a family member, a care person, and/or emergency response personnel (e.g., 911 response team). Making an emergency call, however, typically requires several physical inputs, such as unlocking the mobile devices, bringing a pertinent screen and/or application, touching a keypad, or the like. It would be beneficial for the users if they can make emergency calls without having to provide such physical inputs to the mobile devices.

DETAILED DESCRIPTION

Mobile devices (e.g., cellular phones, mobile phones) provide convenient means to users in various situations, such as managing personal information, making phone calls, getting driving directions guided by a global positioning system (GPS), sharing digital contents through social networking services (SNS), etc. A user of such a mobile device may need to make an emergency call, which typically requires the user to perform several operations directed to the mobile device. For example, the user may have to unlock the mobile device, activate a relevant application (e.g., a directory application storing numerous phone numbers, a phone application showing a keypad when the user memorizes a specific number to call) to bring a pertinent screen and to provide physical inputs thereto (e.g., pressing or touching the keypad on the screen), or the like. In some cases, however, the user may not be able to use hands to access and/or control the mobile device—e.g., physically restrained under a threat, overwhelmed under certain medical conditions, injured by an accident, etc. It would be beneficial for the user to be able to make emergency calls without having to provide physical inputs to the mobile device.

Several embodiments of the present technology may facilitate users of mobile devices making emergency calls through voice activation without using their hands. Moreover, the present technology may be useful for individuals having limited access to the mobile devices (e.g., young children, people with disabilities) to make emergency calls. In some embodiments, the mobile device may be configured to receive sonic signals indicative of a voice of a person (e.g., monitoring the voice of the person) uttering one or more words (e.g., the sonic signals and/or the voice as part of a biometric identifier of the person), which may not constitute a full sentence in some cases. In this regard, the mobile device may be configured to identify the person as an authorized user of the mobile device based on the received sonic signals (e.g., voice). The words are correlated with one of a set of predefined emergency situations stored in the mobile device, the mobile device may determine. Moreover, the mobile device may determine whether the emergency situation satisfies a threshold associated with the emergency situation. Such a threshold, when satisfied, may cause the mobile device to perform certain tasks (e.g., making a phone call). The threshold may facilitate reducing a likelihood of making false (or otherwise unintentional) emergency calls. Further, the mobile device may be configured to estimate a confidence level in determining that the emergency situation satisfies the threshold—e.g., based on the words uttered by the person.

In some cases, the mobile device may increase the confidence level by collecting and/or evaluating additional information. For example, the mobile device may monitor signals related physiological signs of the person from a separate wearable device that the person may carry—e.g., heart rate, perspiration rate, muscle tone and/or piloerection, etc. Additionally, or alternatively, the mobile device may collect data, such as a geographic location of the mobile device (and/or information directed to the surrounding areas of the location), current time of the day, or the like. As a result of evaluating the additional information relevant to determining whether the emergency situation satisfies the threshold, the mobile device may increase the confidence level. In some cases, the mobile device may be configured to recognize and/or utilize contextual information (e.g., implications of certain words, manners in which the words are spoken) in determining that the person (the authorized user) is in an emergency situation that warrants making an emergency call.

Subsequently, the mobile device may perform certain tasks (e.g., making one or more phone calls) based on making such determination. In this regard, the mobile device may be configured to perform different tasks based on severity of the emergency situations. For example, the mobile device may place a phone call to the 911 service, requesting law-enforcement officers and/or paramedic personnel to be dispatched when the emergency situation requires immediate attention. In other examples, the mobile device may place a phone call to a family member and/or a friend (whose phone numbers are stored in the mobile device and designated with certain emergency situations) to come over to assist the person (e.g., bringing certain medications, helping with an injury and/or providing a ride to a hospital for the injury). In yet another example, the mobile device may place a phone call to a teacher and/or a campus safety hotline to diffuse a bullying situation. Further, the mobile device may be configured to make such phone calls without providing an indication that a phone call is being placed, when providing the indication might aggravate the emergency situation.

Figure 1:
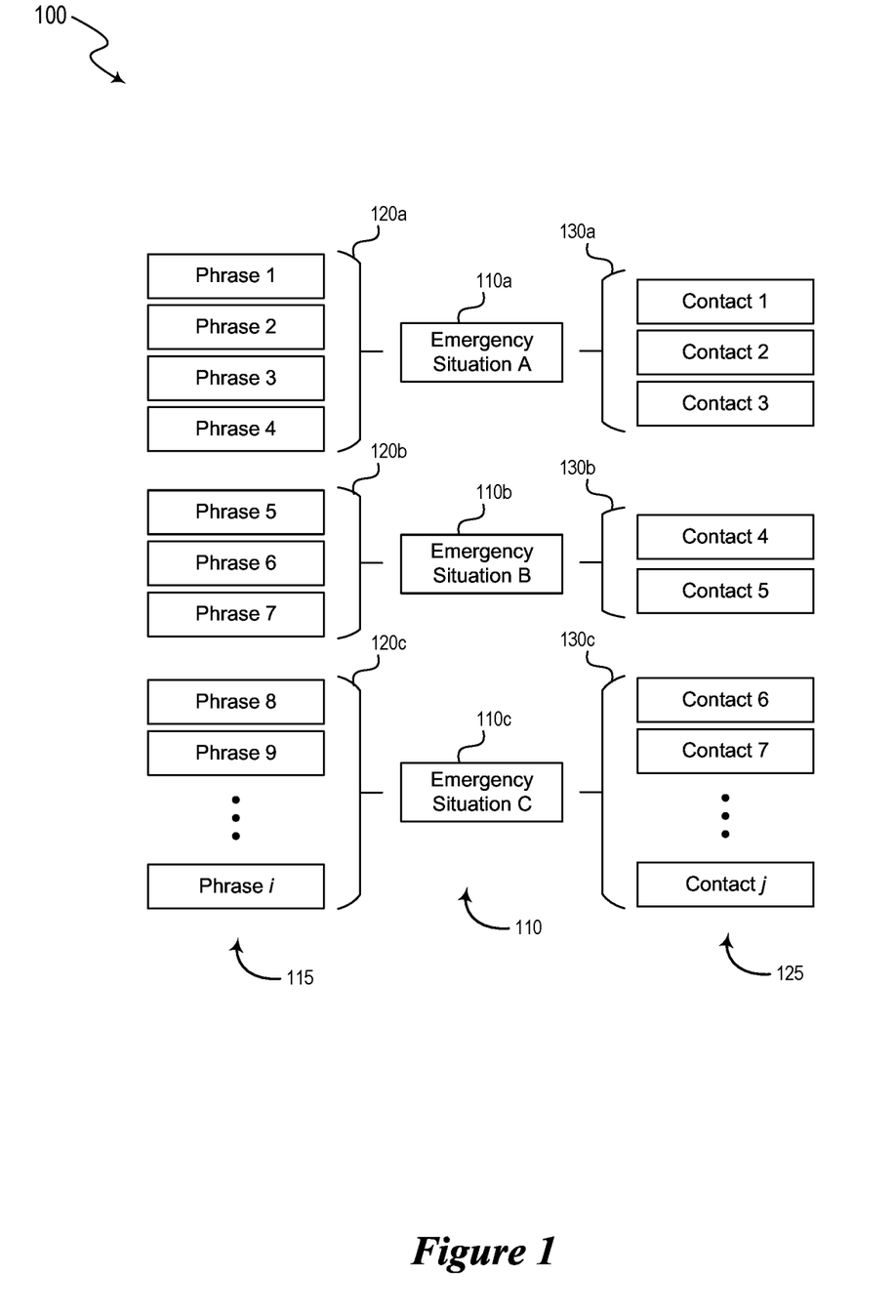
FIG. 1 schematically illustrates an information structure diagram for organizing emergency situations that supports emergency modes for mobile devices in accordance with embodiments of the present technology.

An information structure diagram that supports emergency modes for mobile devices in accordance with embodiments of the present technology is shown in FIG. 1. Such an information structure may facilitate organizing predefined emergency situations stored in a memory of the mobile device. A block diagram of a mobile device that supports emergency modes for mobile devices in accordance with embodiments of the present technology are described with reference to FIG. 2. Flowcharts illustrating methods for emergency modes for mobile devices in accordance with embodiments of the present technology are described with reference to FIGS. 3 and 4.

FIG. 1 schematically illustrates an information structure diagram 100 organizing emergency situations that supports emergency modes for mobile devices in accordance with embodiments of the present technology. The information structure may facilitate organizing predefined emergency situations stored in a memory of a mobile device. The diagram 100 includes a set of predefined emergency situations 110 (e.g., emergency situations 110a through 110c shown for illustration purposes) stored in the mobile device. The diagram 100 also includes a set of phrases 115, which includes multiple subsets 120 (e.g., subsets 120a through 120c shown for illustration purposes) that each have one or more phrases of the set. Further, the diagram illustrates a group of contacts 125, which includes multiple subgroups 130 (e.g., subgroups 130a through 130c shown for illustration purposes) that each have one or more contacts of the group.

Although the diagram 100 depicts three (3) emergency situations, the present technology is not limited thereto. For example, in some embodiments, the information structure may include a less (e.g., two (2) or one (1)) or a greater quantity (e.g., four (4) or five (5), or even more) of emergency situations. Further, the contacts included in individual subgroups 130 may not be mutually exclusive—e.g., the subgroup 130a and the subgroup 130b may include a common contact. Accordingly, the common contact (e.g., a particular family member) may receive a phone call for the emergency situation 110a or the emergency situation 110b, or both.

Individual emergency situations depicted in the diagram 100 (e.g., emergency situation 110a, emergency situation 110b, emergency situation 110c) may represent different emergency situations, which may range from a life-threatening emergency situation (e.g., an armed robbery, a domestic violence involving physical assault) to a relatively benign emergency situation (e.g., fell from stairs, ran out of certain medications, being bullied by strangers). In some embodiments, an authorized user of the mobile device may predefine such emergency situations and store them in the mobile device. Further, different emergency situations may be assigned (designated or allocated) with different thresholds, which may cause the mobile device to perform certain tasks (e.g., placing an emergency call) when satisfied. Also, determining whether a particular emergency situation satisfies a particular threshold assigned it, may be associated with a confidence level.

In some embodiments, the authorized user may predetermine one or more phrases (e.g., the set of phrases 115) that are associated with individual emergency situations, and store them in the mobile device. Such phrases (or statements) may encompass a wide range of expressions, such as "Please don't kill me," "Take all my money but don't hurt me," "I can show you where my jewelry and money," to list a few, as examples to illustrate aspects of the present technology. The predetermined phrases may be classified into multiple subsets (e.g., the subsets 120a through 120c) that each correspond to one of the predefined emergency situations (e.g., the emergency situations 110a through 110c). In some embodiments, the mobile device may ascertain (e.g., determine, identify, confirm) that the one or more words uttered by the authorized user correspond to one of the predetermined phrases to determine that the words correlate with one of the predefined emergency situations. Additionally, or alternatively, the mobile device may be configured to utilize contextual information to correlate the words with an emergency situation—e.g., implications of certain words to distinguish a medical emergency from an emergency situation associated with domestic violence, manners in which certain words are spoken by the authorized user to differentiate a desperate, life-threatening emergency from a relatively benign emergency situation. In this manner, the mobile device may determine that one or more words uttered by the authorized user correlate with one of the predefined emergency situations.

In some cases, the phrases may include certain groups of words (e.g., "not my children," "my jewelry and money," "don't hurt me") that the mobile device is configured to distinguish out of various statements, which may function as a hidden (or otherwise carrying a disparate and/or incomprehensible meaning) passcode for the mobile device to initiate operations to determine whether the person is in an emergency situation. Such phrases, in some cases, may include collections of innocuous-sounding words such that a perpetrator may not realize the words are discreet code for the mobile device to recognize. Additionally, or alternatively, the phrases may include one or more words in a language indigenous to the authorized user. In this manner, the authorized user may speak in his/her mother tongue (e.g., a first language) in an emergency situation, instead of a second language that the mobile device is configured to operate with. Further, the authorized user may hide or otherwise obscure his/her attempts to place an emergency call by speaking in the first language that a third party (e.g., a robber) may not comprehend, when encountered with a clear and present threat from the third party.

The group of contacts 125 included in the diagram 100 may include a variety of emergency contacts and their phone numbers, such as a 911 dispatch station, a campus safety hotline, one or more family members, friends, care-providers, etc. The mobile device may make a phone call using the phone number included in the contacts (e.g., an emergency service, a public authority), based on determining that the emergency situation satisfied the threshold. In some embodiments, the phone call may include information associated with the emergency situation, such as a description of the emergency situation, a geographic location of the mobile device (thus, the location of the emergency situation), current time, or the like. In some cases, the phone call may include a message to a recipient of the call requesting not to make a return call to the mobile device—e.g., when such a return call may jeopardize the user or escalate the emergency situation. In some examples, the mobile device may announce that the mobile device is making such a phone call—e.g., to provide an affirmation to the user, to give an emotional and/or mental support for the user to endure the emergency situation, etc. In other examples, the mobile device may not provide an indication that it is making a call—e.g., to avoid aggravating the emergency situation by warning an aggressor creating the emergency.

By way of example, a mobile device (e.g., a mobile phone) may receive sonic signals indicative of a voice of a person (e.g., monitor the person's voice, which may be part of a biometric identifier of the person that the mobile device can recognize) uttering one or more words (e.g., "I can show you where my jewelry and money," "don't hurt me," etc.). Subsequently, the mobile device may identify, based the received sonic signals, the person as an authorized user of the mobile device. The mobile device may determine, based on the received sonic signals, that the one or more words correlate with an emergency situation (e.g., the emergency situation 110*b* depicted in the diagram 100) out of a set of predefined emergency situations (e.g., the set of predefined emergency situations 110) stored in the mobile device. In this regard, determining the one or more words correlate with the emergency situation may include determining that the one or more words correspond to a phrase from a set of phrases (e.g., Phrase 5 of the subset 120*b*). Additionally, or alternatively, the mobile device may utilize contextual information associated with the one or more words to determine that one of the emergency situations is correlated with the words. As each individual phrase of the set of phrases 115 is coupled with one of the predefined emergency situations (e.g., Phrase 5 indicating Emergency Situation B as depicted in the diagram 100), the mobile device may determine that the person is in the emergency situation (e.g., Emergency Situation B).

Further, the mobile device may determine that the emergency situation satisfies a threshold, at least based on the one or more words in some cases, before performing one or more tasks that may follow—e.g., placing a phone call to one of the contacts in the subgroup 130*b* corresponding to the emergency situation 110*b*. As set forth herein, such a threshold may facilitate the mobile device to avoid falsely determining an emergency situation and making calls, which may be considered frivolous or prank (e.g., making unintentional calls to the 911 dispatch station). For example, a threshold may be established based on a quantity of words matching between one of the predetermined phrases and the one or more words that the person has uttered. In some cases, different emergency situations may be assigned (allocated or designated) with different thresholds.

Moreover, determining that the emergency situation satisfies the threshold may be associated with a confidence level that the mobile device may be configured to estimate. Variations in such a confidence level may stem from uncertainties for the mobile device may encounter while determining whether the emergency situation satisfies the threshold. For example, when the mobile device does not find exact matching words (e.g., despite one or more words that the mobile device monitored are similar to the words in one of the predetermined phrases) and/or when the mobile device finds the words uttered by the person in a particular order that is different from the sequence of words expected by one of the predetermined phrases, the mobile device may assign a relatively low confidence level in determining that the emergency situation satisfied the threshold.

In some embodiments, the mobile device may monitor one or more physiological signals of the person (and/or changes in the physiological signals) via a separate device the person wears (e.g., a smart wrist-band wirelessly coupled with the mobile device). Such physiological signals may include heart rates, blood pressure, respiration rate and/or depth, piloerection, body temperature, muscle tone, perspiration, or the like. In some cases, changes in physiological signals of the person may be accompanied with unnatural speech patterns of the person such as stuttering, stammering, or screaming—e.g., due to extreme adversity and/or tension that the person may face. Accordingly, the mobile device may be configured to recognize such unnatural speech patterns of the person. As a result of utilizing the one or more physiological signals (and/or the changes thereof, or the speech pattern) in addition to the one or more words the person has uttered, the mobile device may increase the confidence level, in some cases.

Additionally, or alternatively, the mobile device may collect data, such as a geographic location of the mobile device that may be determined by a GPS coupled with the mobile device, information associated with the geographic location (e.g., a shopping mall corresponding to the geographic location, a parking structure corresponding to the geographic location, a lighting condition based on sunrise and/or sunset times at the geographic location), current time of the day (e.g., middle of afternoon, late at night), or a combination thereof. In some cases, the mobile device may collect additional data associated with surrounding areas of the geographic location, such as crime rates and/or business entities in a near-by area including the geographic location, or the like. As a result of utilizing the additional data in addition to the one or more words the person has uttered, the mobile device may increase the confidence level.

In some cases, the mobile device may be configured to recognize and/or utilize contextual information (e.g., implications of certain words, manners in which the words are spoken) in determining that the person (the authorized user) is in an emergency situation that warrants making an emergency call. In an embodiment, the contextual information may be utilized to increase the confidence level, in addition to the one or more words the person has uttered. In another embodiments, the contextual information may be utilized to determine that the one or more words the person has uttered correlate with an emergency situation out of the predefined emergency situations stored in the mobile device—e.g., when the one or more words correspond to one phrase from the subset 120*a*, as well as another phrase from the subset 120*b*.

The mobile device may perform one or more tasks—e.g., placing a phone call to one of the contacts (e.g., Contact 4 depicted in the diagram 100) in the subgroup 130*b* corresponding to the emergency situation 110*b*, after determining that the emergency situation satisfies the threshold. In some cases, the mobile device may select a first phone number (e.g., a first phone number of Contact 4) to place a phone call over a second phone number (e.g., a second phone number of Contact 5) based on various factors, such as past response history when emergency calls were placed to the phone numbers, geographic locations of the contacts with respect to the current geographic location of the mobile device, a preference predetermined by the person, or the like. In some cases, the mobile device may place multiple phone calls based on a set of suitable criteria—e.g., concurrently making phone calls to two (or more) phone numbers of a subgroup of contacts determined to be more relevant than other numbers in the subgroup based on, for example, the past history, the geographic location, the preconfigured preference, or the like. In some cases, when one or more calls are not answered, the mobile device may repeat calling the same phone number and/or make a call to a different phone number in the subgroup.

In some embodiments, the one or more tasks that the mobile device may perform, in some cases based on determining that the emergency situation has satisfied the threshold, include analyzing additional phrases (or statements) monitored by the mobile device. Such phrases may be from the person (e.g., the authorized user) or a third party (e.g., an aggressor) around the mobile device. In some cases, the mobile device may start to record the additional phrases based on determining that the emergency situation has satisfied the threshold.

In some embodiments, the mobile device may be configured to include or otherwise leverage an artificial intelligence (AI) algorithm and/or an AI engine. For example, the AI algorithm/engine may improve voice activation of the emergency modes for the mobile device—e.g., determining that the person is an authorized user based on the voice (e.g., sonic signals indicated of the voice). Additionally, or alternatively, the AI algorithm/engine may be utilized in decision making—e.g., determining whether the one or more words correlate with an emergency situation out of the predefined emergency situations stored in the mobile device, determining whether the emergency situation satisfies a threshold based on the one or more words, increasing a confidence level associated with determining that the emergency situation satisfies the threshold, etc. Further, the AI algorithm/engine may be utilized to translate one or more words spoken in the user's first language (e.g., indigenous language to the user) to a second language that the mobile device is configured to operate with. Such an AI algorithm and/or engine may improve a likelihood of determining a relevant emergency situation out of the predefined emergency situations when the one or more words the mobile device monitored are not distinctively clear and/or the one or more words fails to provide a sufficiently high confidence level, even when the mobile device utilizes additional data described herein.

In some embodiments, the phrases included in individual subsets of phrases 120 may not be mutually exclusive—e.g., the subset 120a and the subset 120b may include a common phrase to both. Accordingly, the mobile device may be configured to further refine its decision-making process—e.g., to determine whether certain words uttered by the person better correlate with the emergency situation 110a or the emergency situation 110b. In this regard, the mobile device may utilize additional information—e.g., the physiological signals of the person, the geographical and/or circumstantial information of an area surrounding the location, the contextual information, or a combination thereof. In some cases, the AI algorithm/engine may be utilized in addition to such additional information to determine which emergency situation the user may be in. In other embodiments, the mobile device may detect identical phrases in different subsets of phrases 120—e.g., during the user predetermines the set of phrases 115, and may prompt the user to provide an adequate distinction (e.g., additional words in one of the phrases) between the phrases to differentiate similar phrases such that the mobile device may make an accurate determination as to which emergency situation the user may be in.

Figure 2:
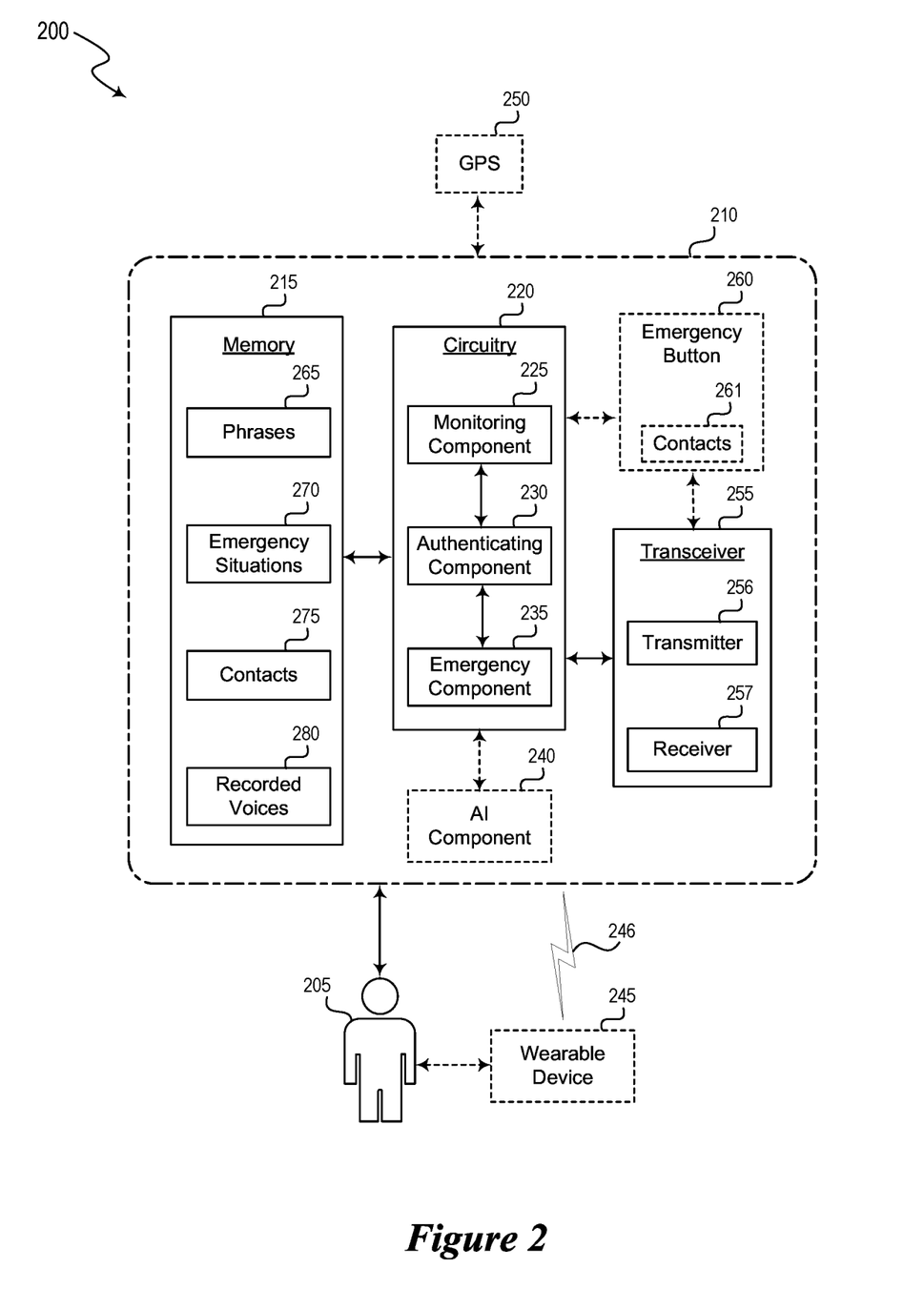
FIG. 2 illustrates a block diagram including a mobile device that supports emergency modes in accordance with embodiments of the present technology.

FIG. 2 illustrates a block diagram 200 including a mobile device 210 that supports emergency modes in accordance with embodiments of the present technology. The diagram 200 also includes a person 205 and a wearable device 245 that the person 205 may carry. Further, the mobile device 210 may be wirelessly coupled with the wearable device 245 (e.g., via a wireless link 246) such that the mobile device 210 can communicate with the wearable device 245 (e.g., via a transceiver 255). The mobile device 210 may be within a suitable distance from the person 205 such that the mobile device 210 may receive sonic signals indicative of a voice of the person 205 (e.g., monitor a voice of the person 205) when the person 205 utters one or more words. The mobile device 210 includes a memory 215 and circuitry 220 that includes a monitoring component 225, an authenticating component 230, an emergency component 235. Moreover, the mobile device 210 may include the transceiver 255 that includes a transmitter 256 and a receiver 257. In some embodiments, the mobile device 210 may further include an artificial intelligence (AI) component 240, as well as an emergency button 260. Moreover, the mobile device 210 may be coupled with a global positioning system (GPS) 250.

The memory 215 may be configured to store a set of predefined emergency situations 270, a collection of recorded sonic signals indicative of voices 280 of one or more authorized users of the mobile device 210, a set of phrases 265 predetermined by an authorized user of the mobile device, a group of contacts 275 (e.g., phone numbers) entered by the authorized user. The set of predefined emergency situations 270 may be an example of or include aspects of the set of predefined emergency situations 110 described with reference to FIG. 1. The set of phrases 265 may be an example of or include aspects of the set of phrases 115 described with reference to FIG. 1. The group of contacts 275 may be an example of or include aspects of the group of contacts 125 described with reference to FIG. 1.

The circuitry 220 may be configured to receive sonic signals indicative of a voice of a person 205 (e.g., monitoring the voice of the person 205) uttering one or more words (e.g., via the monitoring component 225 configured to monitor various sonic signals (e.g., sounds) around the mobile device 210), and identify, based on the received sonic signals, the person as one of the authorized users of the mobile device 210 (e.g., via the authenticating component 230 configured to determine one or more authorized users having access to the mobile device 210). In some embodiments, the circuitry 220 may compare the received sonic signals of the person with the collection of recorded sonic signals indicative of voices 280 stored in the memory 215 to identify the person as one of the authorized users. In some embodiments, the voice may be part of a biometric identifier of the person 205 for the circuitry 220 may utilize to authenticate the person 205. Such a biometric identifier may include various biological trait of the person 205, such as a facial feature, a fingerprint, palm prints, capillary structures (e.g., in a user's iris), or the like.

Subsequently, the circuitry 220 may determine (e.g., via the emergency component 235 configured to identify a particular emergency situation based on the words the person 205 utters) that the one or more words correlate with an emergency situation out of the set of predefined emergency situations 270. In some embodiments, the circuitry 220 may determine that the one or more words correspond to a phrase from the set of phrases 265 stored in the memory 215. In some embodiments, the circuitry 220 may utilize contextual information associated with the one or more words to determine one of the emergency situations is correlated with the words. Further, the circuitry 220 may determine that the emergency situation satisfies a threshold based on the one or more words, where such a determination may be associated with a confidence level. The circuitry 220 may also perform one or more tasks, after determining that the emergency situation satisfies the threshold.

In some embodiments, the circuitry 220 may be configured to monitor one or more physiological signals (and/or changes thereof) of the person 205 via the wearable device 245 that the person may wear. The wearable device 245 may be configured to monitor the one or more physiological signals (and/or the changes thereof) and to transmit such signals to the mobile device 210 (e.g., to the receiver 257 of the transceiver 255 via the wireless link 246). The circuitry 220 may also be configured to utilize the one or more physiological signals (and/or the changes thereof), in addition to the one or more words uttered by the person 205 to increase the confidence level, when determining that the emergency situation satisfies the threshold.

Alternatively, or additionally, in some embodiments, the circuitry 220 may be configured to collect data including a geographic location of the mobile device 210 (e.g., via the GPS 250), information about the geographic location, current time, or a combination thereof. The circuitry 220 may utilize the data in addition to the one or more words uttered by the person 205 to increase the confidence level, when determining that the emergency situation satisfies the threshold.

In some embodiments, the circuitry 220 may be further configured to make a phone call (e.g., via the transmitter 256 of the transceiver 255) to an emergency service and/or a public authority, where the phone call includes a description of the emergency situation, a geographic location of the mobile device 210, current time, a message requesting not to make a return call to the mobile device 210, or a combination thereof. In some instances, placing such a return call may aggravate the emergency situation. In other instances, the person 205 may not be able to answer the return call to confirm the emergency situation. In some cases, the description of the emergency situation may include different messages based on different emergency situations. Further, the description of the emergency situation may indicate that the phone call is generated by the mobile device 210 due to an emergency situation rendering the person 205 unable to make the call. Additionally, or alternatively, the circuitry 220 may be configured to make a phone call to a phone number from the group of contact 275 stored in the memory 215, where the phone number is associated with the emergency situation. In some cases, the circuitry 220 may be configured to understand a language indigenous to the person 205.

In some embodiments, the emergency button 260 (which may be referred to as a panic button) may be located on a side surface (or a backside) of the mobile device 210. The emergency button 260 may exhibit a conspicuous color (e.g., red color). Further, the emergency button 260 may be configured to be activated by a mechanical switching component and/or by a software algorithm. The emergency button 260 may make one or more phone calls to the contacts associated with the emergency button 260 (e.g., phone numbers of contacts 261) when activated—e.g., to an emergency service and/or a public authority, to one or more individuals that the user may designate, etc. The emergency button 260 may be activated when the person 205 presses (and/or touches) it two or more times consecutively. In some embodiments, the emergency button 260 may be covered under a lid. In this manner, the person 205 using the mobile device 210 may avoid making unintentional emergency calls by unwittingly or accidentally activating the emergency button 260.

In some embodiments, the AI component 240 may include an AI algorithm/engine to assist the circuitry 220 to make certain determination—e.g., determining whether the one or more words correlate with an emergency situation out of the predefined emergency situations 270 stored in the mobile device, determining whether the emergency situation satisfies a threshold based on the one or more words, increasing a confidence level associated with determining that the emergency situation satisfies the threshold, etc. In some cases, the AI component 240 may improve voice activation of the emergency modes for the mobile device 210—e.g., determining that the person 205 is an authorized user based on the voice (e.g., sonic signals indicative of the voice). Further, the AI component 240 may assist the circuitry 220 to translate one or more words spoken in the user's first language (e.g., indigenous to the user) to a second language that the mobile device is configured to operate with.

Figure 3:
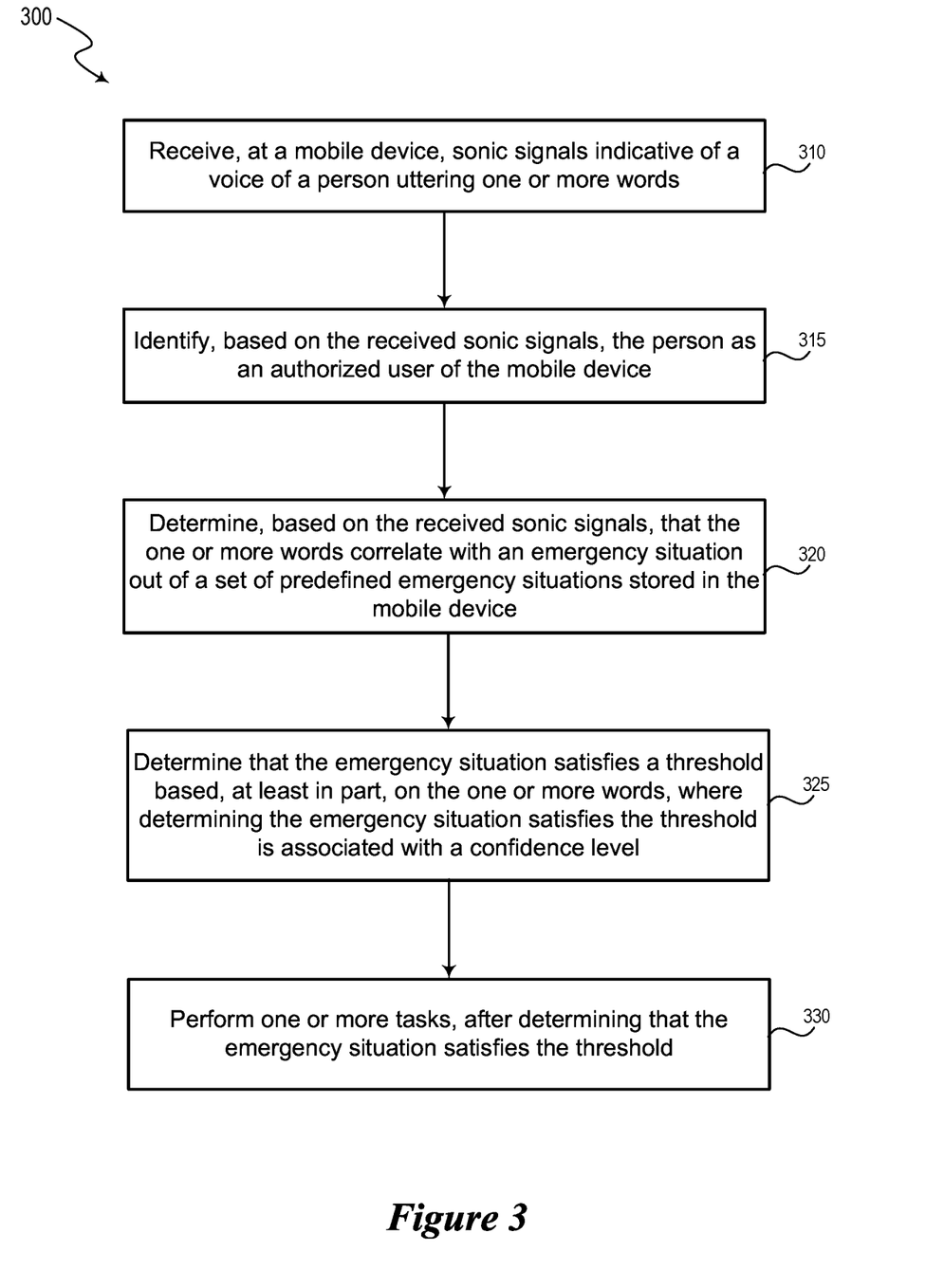
FIGS. 3 and 4 are flowcharts illustrating methods for emergency modes for mobile devices in accordance with embodiments of the present technology.

FIG. 3 is a flowchart 300 illustrating a method for emergency modes for mobile devices in accordance with embodiments of the present technology. The flowchart 300 may be an example of or include aspects of a method that a mobile device (e.g., the mobile device 210) may perform as described with reference to FIGS. 1 and 2.

The method includes receiving, at a mobile device, sonic signals indicative of a voice of a person uttering one or more words (box 310). In accordance with one aspect of the present technology, the monitoring feature of box 310 can be performed by a mobile device (e.g., the mobile device 210), in conjunction with the monitoring component 225 in some cases, as described with reference to FIGS. 1 and 2.

The method further includes identifying, based on the received sonic signals, the person as an authorized user of the mobile device (box 315). In accordance with one aspect of the present technology, the identifying feature of box 315 can be performed by a mobile device (e.g., the mobile device 210), in conjunction with the authenticating component 230 in some cases, as described with reference to FIGS. 1 and 2.

The method further includes determining, based on the received sonic signals, that the one or more words correlate with an emergency situation out of a set of predefined emergency situations stored in the mobile device (box 320). In accordance with one aspect of the present technology, the determining feature of box 320 can be performed by a mobile device (e.g., the mobile device 210), in conjunction with the emergency component 235 in some cases, as described with reference to FIGS. 1 and 2.

The method further includes determining that the emergency situation satisfies a threshold based, at least in part, on the one or more words, where determining that emergency situation satisfies the threshold is associated with a confidence level (box 325). In accordance with one aspect of the present technology, the determining feature of box 325 can be performed by a mobile device (e.g., the mobile device 210), in conjunction with the circuitry 220 in some cases, as described with reference to FIGS. 1 and 2.

The method further includes performing one or more tasks, after determining that the emergency situation satisfies the threshold (box 330). In accordance with one aspect of the present technology, the performing feature of box 330 can be performed by a mobile device (e.g., the mobile device 210), in conjunction with the circuitry 220 in some cases, as described with reference to FIGS. 1 and 2.

In some embodiments, the method may further include comparing the received sonic signals indicative of the voice of the person with a collection of recorded sonic signals indicative of voices of one or more authorized users stored in the mobile device, where identifying the person is based, at least in part, on comparing the received sonic signals of the person with the collection of recorded sonic signals. In some embodiments, determining that the one or more words correlate with the emergency situation includes determining that the one or more words correspond to a phrase from a set of phrases that have been predetermined and stored in the mobile device, where the set of phrases includes multiple subsets that each have one or more phrases of the set, and where each subset having the one or more phrases of the set is associated with a predefined emergency situation of the plurality.

In some embodiments, the method may further include monitoring, after determining that the one or more words correlate with the emergency situation, changes in one or more physiological signals of the person via a separate device the person wears, where the separate device is coupled with the mobile device and configured to monitor the one or more physiological signals. In some embodiments, determining that the emergency situation satisfies the threshold includes utilizing the changes in the one or more physiological signals in addition to the one or more words, and where the confidence level is increased as a result of utilizing the changes in the one or more physiological signals.

In some embodiments, the method may further include collecting, after determining that the one or more words correlate with the emergency situation, data using the mobile device, the data including a geographic location of the mobile device, information about the geographic location, current time, or a combination thereof. In some embodiments, determining that the emergency situation satisfies the threshold includes utilizing the data in addition to the one or more words, and where the confidence level is increased as a result of utilizing the data.

In some embodiments, the one or more tasks comprise making a phone call to an emergency service and/or a public authority, where the phone call includes a description of the emergency situation, a geographic location of the mobile device, current time, a message requesting not to make a return call to the mobile device, or a combination thereof. In some embodiments, the one or more tasks comprise making a phone call to a phone number from a group of phone numbers stored in the mobile device, where the group of phone numbers includes multiple subgroups that each have one or more phone numbers of the group, and where each subgroup having the one or more phone numbers of the group is associated with a predefined emergency situation of the plurality.

In some embodiments, performing the one or more task is carried out without providing an indication that the mobile device performs the one or more tasks. In some embodiments, the method may further include announcing that the one or more tasks have been performed, after performing the one or more tasks. In some embodiments, the one or more words include a language indigenous to the person. In some embodiments, determining that the one or more words correlate with the emergency situation includes utilizing contextual information associated with the one or more words.

Figure 4:
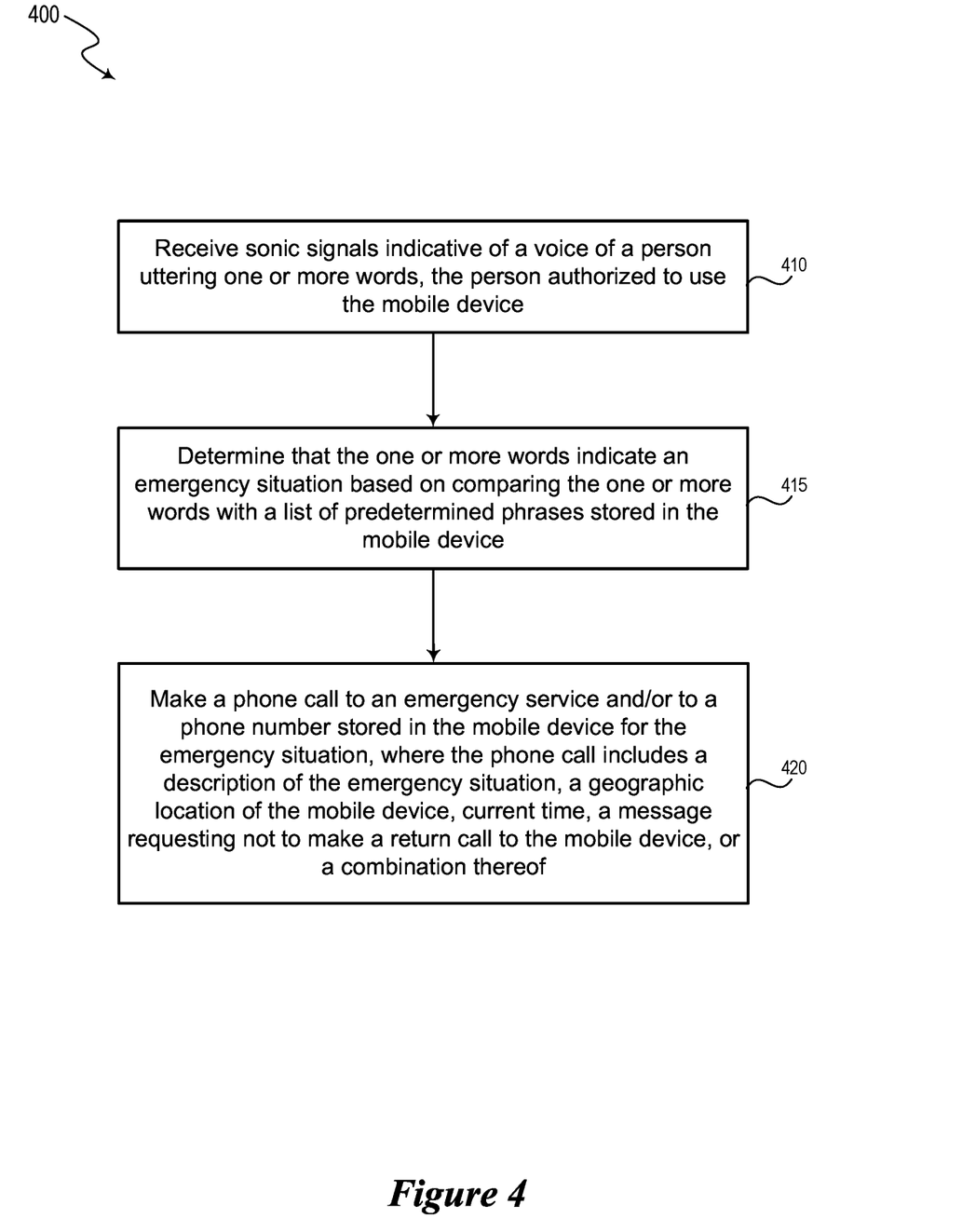

FIG. 4 is a flowchart 400 illustrating a method for emergency modes for mobile devices in accordance with embodiments of the present technology. The flowchart 400 may be an example of or include aspects of a method that a mobile device (e.g., the mobile device 210) may perform as described with reference to FIGS. 1 and 2.

The method includes receiving sonic signals indicative of a voice of a person uttering one or more words, the person authorized to use the mobile device (box 410). In accordance with one aspect of the present technology, the monitoring feature of box 410 can be performed by a mobile device (e.g., the mobile device 210), in conjunction with the monitoring component 225 in some cases, as described with reference to FIGS. 1 and 2.

The method further includes determining that the one or more words indicate an emergency situation based on comparing the one or more words with a list of predetermined phrases stored in the mobile device (box 415). In accordance with one aspect of the present technology, the determining feature of box 415 can be performed by a mobile device (e.g., the mobile device 210), in conjunction with the emergency component 235 in some cases, as described with reference to FIGS. 1 and 2.

The method further includes making a phone call to an emergency service and/or to a phone number stored in the mobile device for the emergency situation, where the phone call includes a description of the emergency situation, a geographic location of the mobile device, current time, a message requesting not to make a return call to the mobile device, or a combination thereof (box 420). In accordance with one aspect of the present technology, the making feature of box 420 can be performed by a mobile device (e.g., the mobile device 210), in conjunction with the circuitry 220 in some cases, as described with reference to FIGS. 1 and 2.

It should be noted that the methods described above describe possible implementations, and that the operations and the steps may be rearranged or otherwise modified and that other implementations are possible. Furthermore, embodiments from two or more of the methods may be combined.

The functions described herein may be implemented in hardware, software executed by a processor, firmware, or any combination thereof. Other examples and implementations are within the scope of the disclosure and appended claims. Features implementing functions may also be physically located at various positions, including being distributed such that portions of functions are implemented at different physical locations.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

From the foregoing, it will be appreciated that specific embodiments of the invention have been described herein for purposes of illustration, but that various modifications may be made without deviating from the scope of the invention. Rather, in the foregoing description, numerous specific details are discussed to provide a thorough and enabling description for embodiments of the present technology. One skilled in the relevant art, however, will recognize that the disclosure can be practiced without one or more of the specific details. In other instances, well-known structures or operations often associated with memory systems and devices are not shown, or are not described in detail, to avoid obscuring other aspects of the technology. In general, it should be understood that various other devices, systems, and methods in addition to those specific embodiments disclosed herein may be within the scope of the present technology.

What is claimed is:

1. A method, comprising:
   receiving, at a mobile device, sonic signals indicative of a voice of a person uttering one or more words;
   identifying, based on the received sonic signals, the person as an authorized user of the mobile device;
   determining, based on the received sonic signals, that the one or more words correlate with an emergency situation out of a plurality of predefined emergency situations stored in the mobile device;

monitoring, after determining that the one or more words correlate with the emergency situation, changes in one or more physiological signals of the person via a separate device the person wears, wherein the separate device is coupled with the mobile device and configured to monitor the one or more physiological signals;

determining that the emergency situation satisfies a threshold based, at least in part, on the one or more words and utilizing the changes in the one or more physiological signals, wherein determining the emergency situation satisfies the threshold is associated with a confidence level, and wherein the confidence level is increased as a result of utilizing the changes in the one or more physiological signals; and performing one or more tasks, after determining that the emergency situation satisfies the threshold.

2. The method of claim 1, further comprising:

comparing the received sonic signals indicative of the voice of the person with a collection of recorded sonic signals indicative of voices of one or more authorized users stored in the mobile device, wherein identifying the person is based, at least in part, on comparing the received sonic signals of the person with the collection of recorded sonic signals.

3. The method of claim 1, wherein determining that the one or more words correlate with the emergency situation includes determining that the one or more words correspond to a phrase from a set of phrases that have been predetermined and stored in the mobile device, wherein the set of phrases includes multiple subsets that each have one or more phrases of the set, and wherein each subset having the one or more phrases of the set is associated with a predefined emergency situation of the plurality.

4. The method of claim 1, further comprising:

collecting, after determining that the one or more words correlate with the emergency situation, data using the mobile device, the data including a geographic location of the mobile device, information about the geographic location, current time, or a combination thereof.

5. The method of claim 4, wherein determining that the emergency situation satisfies the threshold includes utilizing the data in addition to the one or more words, and wherein the confidence level is increased as a result of utilizing the data.

6. The method of claim 1, wherein the one or more tasks comprise making a phone call to an emergency service and/or a public authority, wherein the phone call includes a description of the emergency situation, a geographic location of the mobile device, current time, a message requesting not to make a return call to the mobile device, or a combination thereof.

7. The method of claim 1, wherein the one or more tasks comprise making a phone call to a phone number from a group of phone numbers stored in the mobile device, wherein the group of phone numbers includes multiple subgroups that each have one or more phone numbers of the group, and wherein each subgroup having the one or more phone numbers of the group is associated with a predefined emergency situation of the plurality.

8. The method of claim 1, wherein performing the one or more tasks is carried out without providing an indication that the mobile device performs the one or more tasks.

9. The method of claim 1, wherein determining that the one or more words correlate with the emergency situation includes utilizing contextual information associated with the one or more words.

10. The method of claim 1, wherein the one or more words include a language indigenous to the person.

11. A mobile device, comprising:

a memory configured to store a plurality of predefined emergency situations, a collection of recorded sonic signals indicative of voices of one or more authorized users of the mobile device, a set of phrases predetermined by a user of the mobile device, a group of phone numbers entered by the user, or a combination thereof; and circuitry configure to:

receive sonic signals indicative of a voice of a person uttering one or more words;

identify, based on the received sonic signals, the person as one of the authorized users of the mobile device;

determine that the one or more words correlate with an emergency situation out of the plurality of predefined emergency situations;

monitor changes in one or more physiological signals of the person via a separate device that the person wears, wherein the separate device is coupled with the mobile device and configured to monitor the one or more physiological signals;

determine that the emergency situation satisfies a threshold based, at least in part, on the one or more words and utilizing the changes in the one or more physiological signals, wherein determining the emergency situation satisfies the threshold is associated with a confidence level, and wherein the confidence level is increased based on utilizing the changes in the one or more physiological signals; and perform one or more tasks, after determining that the emergency situation satisfies the threshold.

12. The mobile device of claim 11, wherein the circuitry is further configured to:

determine that the one or more words correspond to a phrase from the set of phrases stored in the memory.

13. The mobile device of claim 11, wherein the circuitry is further configured to:

collect data including a geographic location of the mobile device, information about the geographic location, current time, or a combination thereof; and utilize the data in addition to the one or more words to increase the confidence level, when determining that the emergency situation satisfies the threshold.

14. The mobile device of claim 11, wherein the circuitry is further configured to:

make a phone call to an emergency service and/or a public authority, wherein the phone call includes a description of the emergency situation, a geographic location of the mobile device, current time, a message requesting not to make a return call to the mobile device, or a combination thereof; or make a phone call to a phone number from the group of phone numbers stored in the mobile device, wherein the phone number is associated with the emergency situation.

15. The mobile device of claim 11, wherein the circuitry is further configured to:

understand a language indigenous to the person.

16. The mobile device of claim 11, further comprising:

a button located on a side surface of the mobile device, wherein the button is configured to make a phone call to an emergency service and/or a public authority when consecutively pressed two or more times.

17. A method for operating a mobile device, comprising:

receiving sonic signals indicative of a voice of a person uttering one or more words, the person authorized to use the mobile device;

determining that the one or more words indicate an emergency situation based on comparing the one or more words with a list of predetermined phrases stored in the mobile device;

monitoring, after determining that the one or more words indicate the emergency situation, changes in one or more physiological signals of the person via a separate device the person wears, wherein the separate device is coupled with the mobile device and configured to monitor the one or more physiological signals;

determining that the emergency situation satisfies a threshold based, at least in part, on the one or more words and utilizing the changes in the one or more physiological signals, wherein determining the emergency situation satisfies the threshold is associated with a confidence level, and wherein the confidence level is increased as a result of utilizing the changes in the one or more physiological signals; and making a phone call to an emergency service and/or to a phone number stored in the mobile device for the emergency situation, wherein the phone call includes a description of the emergency situation, a geographic location of the mobile device, current time, a message requesting not to make a return call to the mobile device, or a combination thereof.

\* \* \* \* \*